(12) United States Patent
Jiang et al.

(10) Patent No.: US 10,742,480 B2
(45) Date of Patent: Aug. 11, 2020

(54) NETWORK MANAGEMENT AS A SERVICE (MAAS) USING REVERSE SESSION-ORIGINATION (RSO) TUNNEL

(71) Applicant: VMware, Inc., Palo Alto, CA (US)

(72) Inventors: Louie Jiang, Sunnyvale, CA (US); Girish Thombare, San Jose, CA (US); Hongxing Li, Palo Alto, CA (US); Dmitry Korotkov, Union City, CA (US)

(73) Assignee: VMware, Inc., Palo Alto, CA (US)

( * ) Notice: Subject to any disclaimer, the term of this patent is extended or adjusted under 35 U.S.C. 154(b) by 170 days.

(21) Appl. No.: 15/167,626

(22) Filed: May 27, 2016

(65) Prior Publication Data

US 2017/0104621 A1    Apr. 13, 2017

Related U.S. Application Data

(63) Continuation-in-part of application No. 14/971,872, filed on Dec. 16, 2015, now Pat. No. 10,609,110.

(60) Provisional application No. 62/240,075, filed on Oct. 12, 2015.

(51) Int. Cl.
  *H04L 12/24* (2006.01)
  *H04L 29/06* (2006.01)
  *H04L 29/08* (2006.01)

(52) U.S. Cl.
  CPC ........ *H04L 41/046* (2013.01); *H04L 41/0853* (2013.01); *H04L 41/147* (2013.01); *H04L 67/141* (2013.01); *H04L 67/42* (2013.01)

(58) Field of Classification Search
  CPC .... H04L 41/046; H04L 41/0853; H04L 67/42
  USPC ......................................................... 709/202
  See application file for complete search history.

(56) References Cited

U.S. PATENT DOCUMENTS

| 7,545,780 | B2 | 6/2009 | Chitrapu | |
|---|---|---|---|---|
| 7,979,528 | B2* | 7/2011 | Eisenberg | H04L 29/06 709/224 |
| 8,626,891 | B2 | 1/2014 | Guru et al. | |
| 8,661,132 | B2 | 2/2014 | Dorai et al. | |
| 8,782,794 | B2 | 7/2014 | Ramcharran | |
| 8,875,237 | B2 | 10/2014 | Engdahl et al. | |
| 9,037,980 | B2* | 5/2015 | Gastaldi | G06Q 10/10 715/753 |
| 9,929,969 | B1 | 3/2018 | Krottapalli et al. | |
| 2004/0098623 | A1 | 5/2004 | Scheidell | |
| 2007/0127496 | A1* | 6/2007 | Tjandra | H04W 76/022 370/395.52 |
| 2010/0269109 | A1* | 10/2010 | Cartales | G06F 9/5072 718/1 |
| 2011/0258432 | A1* | 10/2011 | Rao | H04L 63/08 713/150 |
| 2012/0066375 | A1* | 3/2012 | Phaal | H04L 43/022 709/224 |
| 2012/0110156 | A1 | 5/2012 | Guru et al. | |

(Continued)

*Primary Examiner* — Joseph L Greene

(57) ABSTRACT

A Management-as-a-Service (MaaS) agent running on a client network creates a reverse session-origination (RSO) tunnel between the client network and a MaaS server. The MaaS agent collects client statistics at and regarding the client network and transmits the client statistics to the MaaS server. The MaaS server analyzes the client data and sends alerts or other messages to a user, who may be outside the client network, in the event certain conditions are met.

16 Claims, 7 Drawing Sheets

(56) References Cited

U.S. PATENT DOCUMENTS

| | | | |
|---|---|---|---|
| 2013/0042123 A1* | 2/2013 | Smith | G06F 9/5077 |
| | | | 713/300 |
| 2014/0122430 A1* | 5/2014 | Dary | G06Q 10/0639 |
| | | | 707/624 |
| 2015/0009995 A1* | 1/2015 | Gross, IV | |
| 2015/0172345 A1 | 6/2015 | Mantin et al. | |
| 2016/0127230 A1 | 5/2016 | Cui et al. | |
| 2018/0027006 A1* | 1/2018 | Zimmermann | H04L 63/1425 |

\* cited by examiner

NETWORK MANAGEMENT AS A SERVICE (MAAS) USING REVERSE SESSION-ORIGINATION (RSO) TUNNEL

This application is a continuation-in-part (CIP) of copending patent application Ser. No. 14/971,872 filed 2015-Dec.-16. This application claims priority based on provisional application 62/240,075 filed 2015-Oct.-12.

BACKGROUND

Small and medium-sized businesses (SMBs) typically have on-premises computer networks connected to the Internet via a firewall. For security purposes, the firewall restricts communications between the on-premises network and the Internet at large. The firewall can then make it difficult for legitimate users to access the on-premises network remotely. Accordingly, some on-premises networks are set up to allow remote access using Virtual Private Networks (VPNs) that provide a secure channel through the firewall between the remote user and the on-premises network. Functionally, the remote device becomes part of the on-premises network.

However, it can be costly and cumbersome to set up a computer system network for VPN access. VPNs can be problematic; for example, there can be address conflicts, especially in cases in which a user connects to more than one VPN at a time. Such address conflicts can prevent a user from contacting all devices on conflicting networks. As a result, many SMBs eschew VPNs, thus narrowing their capacity for remote management and opportunities for increased productivity.

DETAILED DESCRIPTION

Figure 1:
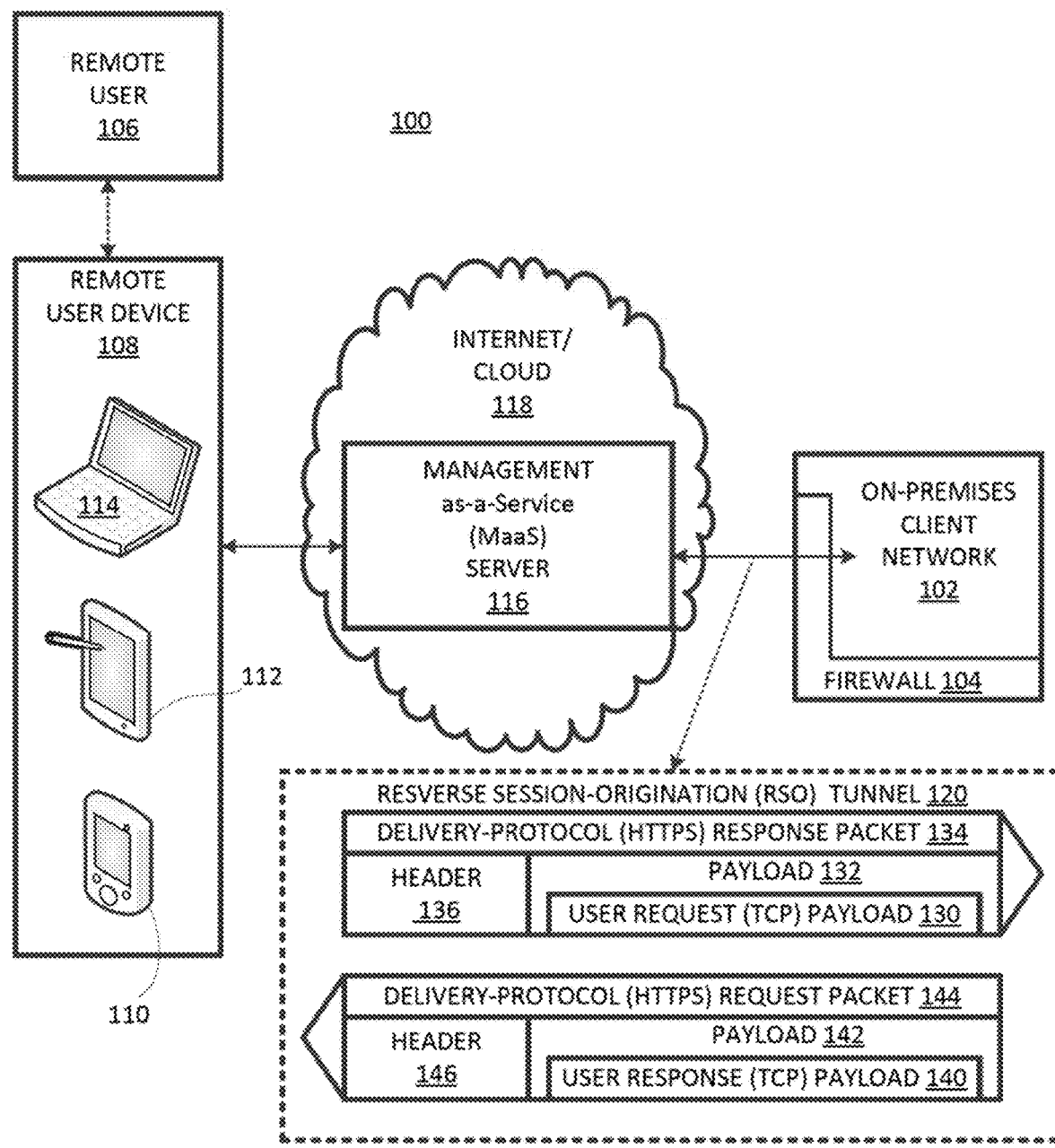
FIG. 1 is a schematic diagram of a digital environment allowing remote access to a client network using a reverse session-origination (RSO) tunnel.

Herein, a Management-As-A-Service (MaaS) server communicates with a client network through its firewall using a reverse session-origination (RSO) tunnel. A remote user can access and manage the client network via the MaaS server. In addition, a MaaS agent residing on the client network can create the RSO tunnel, as well as collect and forward to the MaaS, metrics data regarding the client network, e.g., its virtual machines (VMs). The MaaS server stores the collected client-side data in a database, which can be queried by a user. In addition, an analysis engine on the MaaS server can analyze the stored client-side data and provide alerts and recommendations to a user. Depending on the scenario, the recommendations may be based on data from a single client network that the user is authorized to access, or may be based at least in part on data from plural client networks, including at least one that the user is not authorized to access.

Herein, a "tunnel" is a network channel in which packets of a "payload protocol" are encapsulated as payloads in packets of a "delivery protocol" in a manner not called for by an applicable Internet Protocol Suite. For example, while the Internet Protocol Suite would call for encapsulating a packet of an application layer protocol (e.g., the HyperText Transfer Protocol, abbreviated "HTTP"), as a payload in a transport layer protocol (e.g., Transmission Control Protocol or TCP), it would not call for encapsulating a TCP packet in an HTTP packet. Some embodiments herein employ tunnels in which TCP packets are encapsulated in HTTPS packets, where HTTPS ("HTTP Secure") is a secure variant of HTTP employing a Secure Sockets Layer (SSL) protocol or a Transport Layer Security (TLS) protocol. As is conventional, "SSL" is used herein to refer to both SSL and TLS protocols.

Although they provide for bi-directional communication between a client and a server, HTTP and HTTPS are examples of unidirectional session-origination protocols. Request-response sessions, i.e., sequences of requests and responses, are at least predominantly originated by client requests to a server. Thus, the forward direction for session origination is from client to server. The payloads, e.g., user requests and responses, may also have an associated direction of origination, which may be the same or opposite the direction of origination associated with the delivery protocol. If they are the same, the tunnel is a "forward session-origination (FSO) tunnel"; if they are opposite, the tunnel is a "reverse session-origination (RSO) tunnel". As the terms are used herein, bi-directional session-origination tunnels are neither FSO nor RSO.

Herein, a remote user initiates communication sessions by issuing requests, some of which may actually be commands. The client network responds to each request, e.g., by providing requested information or indicating that a user command has been implemented. So, remote user sessions originate server-side, i.e., outside the client network, and are directed to the client network. In other words, the direction of session origination for the delivery protocol is the reverse of the direction of origination of the user sessions. In this sense, the tunnels herein are reverse session-origination (RSO) tunnels.

RSO tunnels face a challenge as the user is not on-premises with the client that originates the session-originating delivery protocol requests. Accordingly, a MaaS agent can be installed on the client network to provide for user-less generation of delivery-protocol requests. The MaaS agent can also unwrap user requests from delivery protocol responses and forward the unwrapped user requests to their intended on-premises destination. The MaaS agent can also wrap responses to user requests in delivery-protocol requests. While the MaaS agent requires installation, the effort involved is comparable to installing an application, and is much less burdensome than setting up a client network for VPNs.

A surprising additional benefit of the client-side MaaS agent is that it can be used to form the tunnel itself by forwarding an on-premises port to a port on the MaaS server.

The agent can be triggered to establish a connection between itself and an agent connection endpoint (ACE) on the MaaS server. The ACE, which would typically be co-developed with the MaaS agent, wraps user requests in delivery-protocol responses and unwraps user responses (to user requests) from delivery-protocol requests.

Another challenge for an RSO tunnel is that the MaaS server may have to wait until there is a pending delivery-protocol request before the MaaS server can forward a user request to the on-premises client network. This wait is in addition to any increased latency due to access being remote instead of local (i.e., from an on-premises user). So that the remote-user experience is not unduly degraded, the MaaS agent can act to minimize the duration of intervals during which no delivery-protocol request is pending. This can involve generating and transmitting dummy requests (e.g., bearing no information to be forwarded to the user); user requests can then be wrapped into responses to the dummy requests.

In some embodiments, the MaaS server simply wraps a user request into a delivery-protocol response. In other embodiments, some translation of the user request as received is involved. In further embodiments, the MaaS server performs more complex translations. For example, a user may request hourly processor utilization reports, in which case, the MaaS server may schedule user requests to be sent hourly. In still other embodiments, the MaaS server may generate its own "user requests" that are not in response to specific requests from a remote user. For example, a MaaS server may request that the MaaS agent monitor the client network and, to that end, generate probes for specific system health information regarding the on-premises client network. In summary, the services provided by a MaaS server can range from simple forwarding to complex artificial intelligence systems for monitoring and maintaining one or more on-premises client networks.

Remote (that is, off-premises and outside firewall 104) users can connect to a MaaS server using an app or a web browser. The MaaS site can take care of authentication and authorization, prioritizing requests, and so on. The MaaS server can store network data collected by the MaaS agent. Herein, "network data" encompasses data collected from a network. Examples include total and per-VM hardware-resource utilization data and performance data. In addition, network data encompasses configuration data and configuration change data. The MaaS server can use artificial intelligence and other functionality to provide for automatic proactive management of the on-premises network.

For example, a digital environment 100 can include an SMB-owned on-premises client network 102, as shown in FIG. 1. Client network 102 includes a firewall 104 that allows Internet access, while protecting client network 102 from unauthorized access. A user 106, e.g., an owner or employee of the SMB, may obtain remote access using an app or web browser executing on a remote device 108, such as a smartphone 110, a tablet 112, or a laptop computer 114. Remote access to client network 102 is provided via an Internet-based MaaS server 116 located on the Internet/cloud 118 and outside firewall 104. The remote device 108 can access MaaS server 116 using an HTTPS protocol, a cellular protocol, or another protocol.

In various embodiments, an on-premises client network includes one or more computers. One or more of the computers may serve as a physical host for virtual machines, which may, in turn, run applications or other programs. To this end, a hypervisor or other virtual machine monitor may execute on the host hardware. In an embodiment, MaaS server 116 may host MaaS software for managing virtual machines executing in client network 102. Herein, the hosts, hypervisors, and virtual machines are all considered part of the client network.

MaaS server 116 accesses client network 102 via an RSO tunnel 120. User sessions may be originated by the user at a user device 108. In that case, the MaaS server 116 may forward the user requests (modified or unmodified) to the client network 102 via RSO tunnel 120. Alternatively, MaaS server 116 may generate its own remote user requests destined for client network 102.

User requests can be packetized and the user-request packets can be sent over RSO tunnel 120 to client network 102. The user requests can be conveyed according to a protocol understood by the intended destination within client network 102. In the illustrated embodiment, the user protocol is the TCP/IP transport layer TCP protocol. The payloads of the user request packets may be encapsulated as payloads of delivery-protocol packets. The delivery protocol can be, for example, HTTPS. As shown in FIG. 1, a user request (TCP) packet 130 can be encapsulated as a payload 132 of a delivery-protocol packet 134 that also includes a delivery-protocol header 136 (to specify, for example, an origin, a destination and a session identifier). Upon receipt at client network 102, the user-request payload 130 is extracted, a TCP header is added, and the resulting TCP packet is transmitted to its destination within client network 102.

Similarly, a user response, generated by client network 102 in response to a user request, can be packetized into user-response packets destined for MaaS server 116 and/or user 106. Each user-response payload 140 can be wrapped as a payload 142 in a delivery-protocol request packet 144. In addition to the payload, the delivery-protocol request packet can include a header 146, for example, specifying an origin, a destination, and a session identifier. The delivery protocol request payload 144 is then transmitted to MaaS server 116 via RSO tunnel 120. However, to preserve tunnel bandwidth for incoming data, some outgoing data can be sent through a path that bypasses the RSO tunnel.

Upon receipt at server 116, the user-response payload 140 is then extracted from the delivery-protocol request packet 144, a header is added, and the resulting user-response packet is consumed at MaaS server 116 and/or forwarded to and consumed by user 106.

In the illustrated embodiment, the delivery-protocol packet 134 includes, as its payload, only the payload of a payload-protocol packet 130. The payload-protocol header is not included as part of the delivery-protocol payload. The source and destination are determined by the tunnel itself, so the payload-protocol header is not needed to specify them. Omitting the payload protocol header in the delivery-protocol payload avoids certain potential address conflicts.

In summary, payload-protocol user requests are wrapped in delivery-protocol responses, and payload-protocol user responses are wrapped in delivery protocol requests. The user sessions originate as transmissions toward client network 102, while the delivery protocol sessions originate as transmissions from client network 102. Hence, the characterization of tunnel 120 as reverse session origination.

Figure 2:
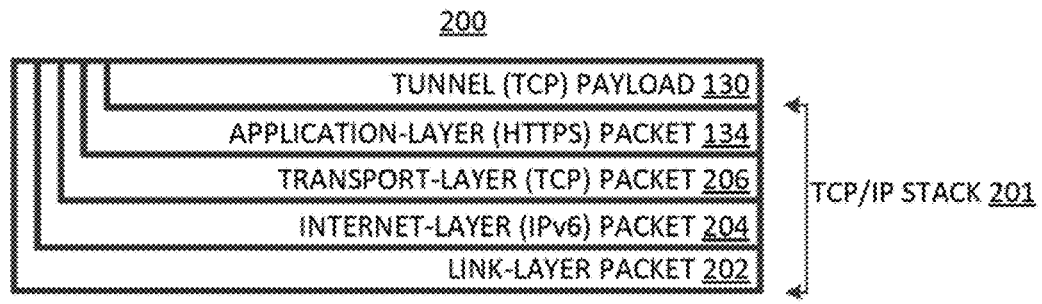
FIG. 2 is a schematic diagram showing a nested packet of the digital environment of FIG. 1.

Note that the terms "delivery protocol" and "payload protocol" are defined relative to each other. For example, the HTTPS delivery protocol of FIG. 1 resides at the application layer of the Internet Protocol Suite, otherwise known as "TCP/IP". The Internet Protocol Suite defines a four-layer stack including: a link layer, an Internet layer, a transport layer, and an application layer. Tunneling contributes an additional layer, resulting in the 5-layer stack of FIG. 2.

Thus, a tunnel stack 200 can have a link-layer packet 202 encapsulating an Internet-layer (e.g., Internet Protocol Layer version 6 or IPv6) packet 204. The Internet layer packet 204 can encapsulate a transport layer 206, e.g., TCP, packet 134. The transport layer packet 206 can encapsulate an application layer, e.g., HTTPS, packet 134. The application layer HTTPS packet 134 can include as its payload the payload of a TCP packet 130. To avoid confusion, it can be helpful to keep in mind that the tunnel TCP payload 130 is distinct from the transport-layer packet 206, despite the fact that they both may conform to the TCP protocol.

As explained above, a user request packet is encapsulated in a delivery-protocol response packet. However, the delivery-protocol response must refer to a previously generated delivery protocol request or to a session originated by a previously generated delivery-protocol request. In other words, a user request cannot be sent to the network client 102 (FIG. 1) until MaaS server 116 has received a corresponding delivery-protocol request. As a result, transmission of a user request can be delayed by the time spent waiting for a delivery-protocol request to be received from client network 102. By ensuring a practically continuous presence of a delivery-protocol request packet, RSO tunnel 120 minimizes this delay to near zero.

Figure 3:
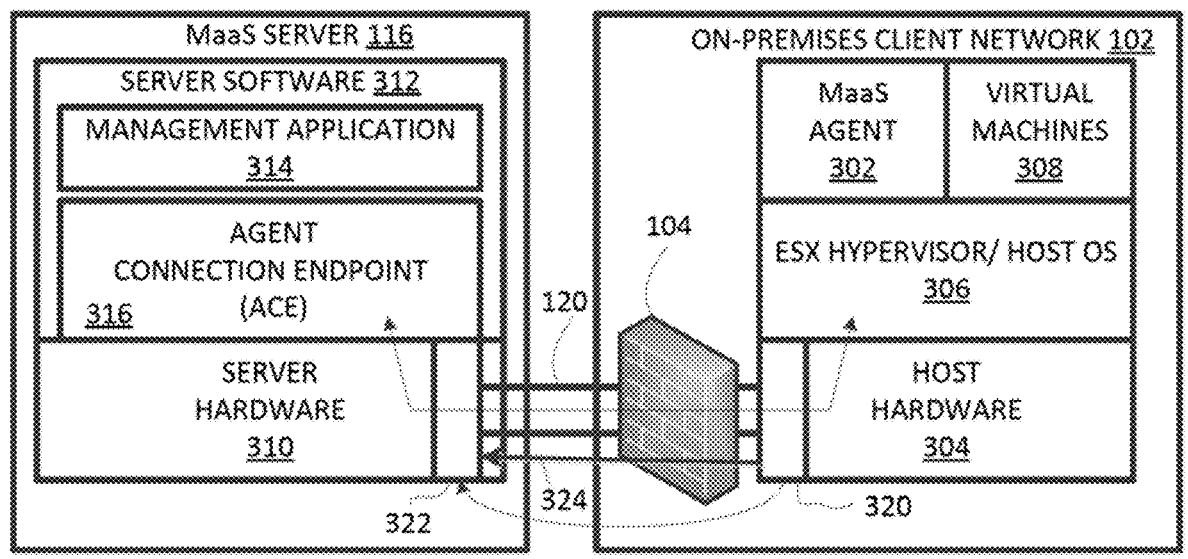
FIG. 3 is a schematic diagram of a Management-As-A-Service (MaaS) server and a client network connected by the RSO tunnel of FIG. 1.

To provide the prerequisite requests, a MaaS agent 302, shown in FIG. 3, is installed on client network 102. As shown in FIG. 3, client network 102 includes host hardware 304, a hypervisor 306 running on hardware 304, and virtual machines 308 running on hypervisor 306. Hypervisor 306 can be, for example, ESX, available from VMware, Inc. MaaS agent 302 runs on hypervisor 306. In other embodiments, the MaaS agent can run on a host operating system that is separate from the hypervisor or on a hypervisor that is separate from a host OS, or elsewhere3. Depending on the embodiment, a MaaS agent and the virtual machines it helps in managing may run on the same on-premises physical host and/or on different on-premises physical hosts.

MaaS server 116 includes server hardware 310 and server software 312. Software 312 is software encoded in media included in server hardware 310. In the illustrated embodiment, server software 312 includes a management application 314 to provide management as a service (MaaS), and an agent connection point (ACE) 316. Management application 314 is used to manage virtual machines 308 via hypervisor 306. Hypervisor 306 can acknowledge that management commands have been implemented and can provide status information regarding virtual machines 308 in response to user requests therefor.

MaaS agent 302 can create RSO tunnel 120 by forwarding a client-side port 320 of client network 102 to a server-side port 322 of server 116. MaaS agent 302 can packetize, encrypt, wrap, and transmit user-response packets from hypervisor 306; this is one way to generate the request packets needed to transport user requests to client network 102. MaaS agent 302 can also unwrap, decrypt, and forward to hypervisor 306, user requests. MaaS agent 302 can also generate dummy packets to minimize the amount of time in which no delivery-protocol request is pending and to minimize the time a user request must wait before being wrapped and transmitted to client network 102. To preserve bandwidth for incoming communications, some data, e.g., metrics data, can be sent from client network 102 to MaaS server 116 via a path 324 that bypasses tunnel 120, as firewall 120 is more permissive with outgoing communications than it is with incoming communications.

Figure 4:
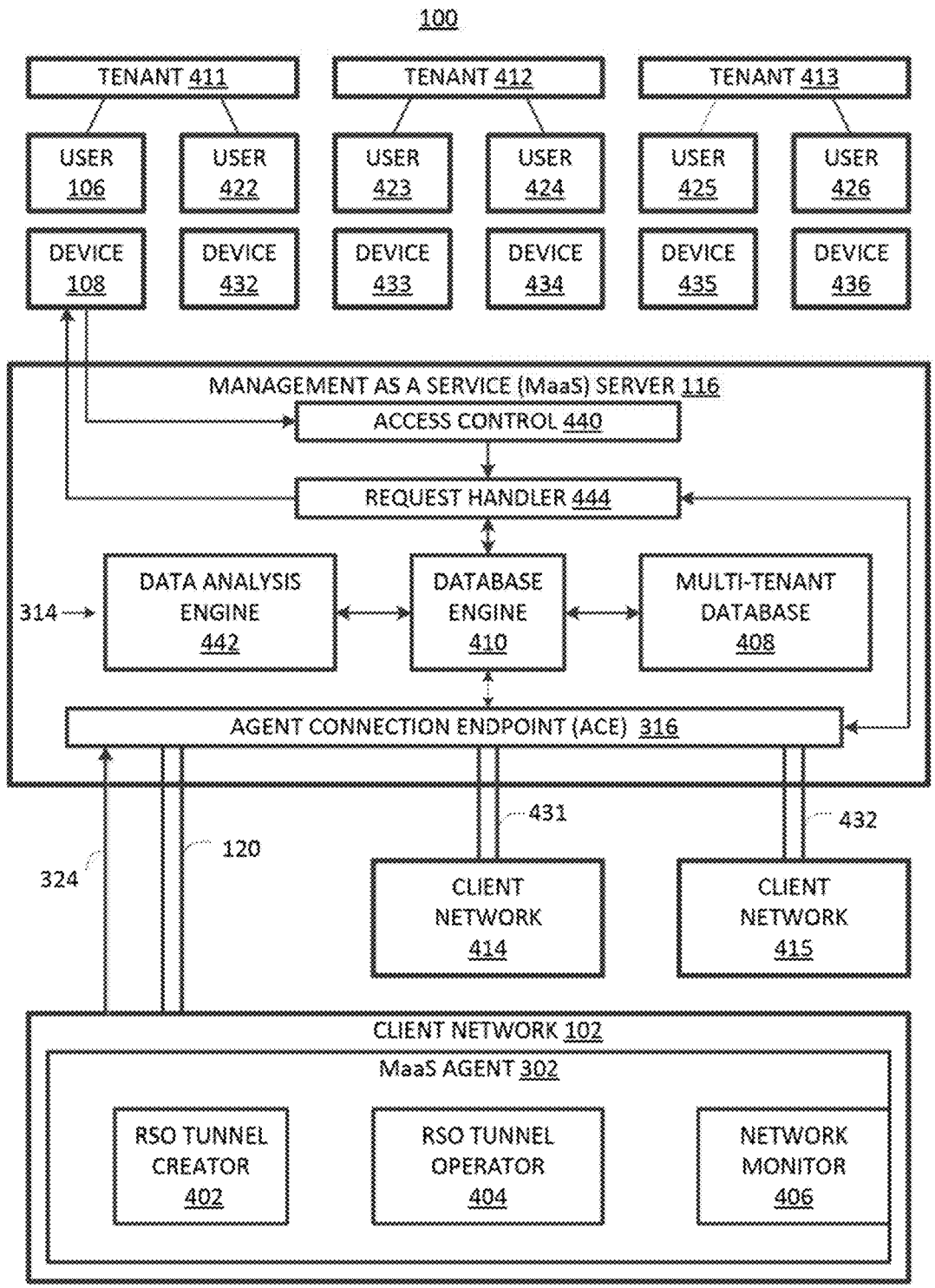
FIG. 4 is a schematic diagram of the digital environment of FIG. 1 and showing additional details.

As shown in FIG. 4, MaaS agent 302 includes an RSO tunnel creator 402, an RSO tunnel operator 404, and a client-side network monitor 406. Once MaaS agent 302 is installed, tunnel 120 can be created, either upon launch, or in response to a command from an on-premises user. More specifically, MaaS agent 302 can forward port 320 to ACE 316 to form tunnel 120.

Tunnel operator 404 can calibrate and operate RSO tunnel 120. Operator 404 can calibrate tunnel 120 by sending a calibration request, waiting for it to time out, and measuring the time it took for the request to time out. A threshold can be set as a percentage, e.g., of the time-out duration. The time-out duration can be specified by dummy requests. If no user request is pending during the time-out duration, ACE 316 can send a dummy response to prevent a time-out. If a user request is pending, ACE 316 responds with the user request. If a user request is pending during a calibration request, ACE 316 responds with a user response; tunnel operator 404 can then send a new calibration request. Tunnel operator 404 can also send monitor and other client-side data to management server 116 either through tunnel 120 or alternate communications paths 324.

Network monitor 406 monitors on-premises client network 102, e.g., collects performance and utilization data from client network 102 and its components, e.g., virtual machines and their hosts. Utilization data can include percentage of available processor cycles being used, percentage of available bandwidth being used, and percent of storage device being used. Performance data can include the times required to perform certain tasks or the latencies involved in performing certain tasks. In addition, network monitor can obtain network data from configuration change logs and from error logs. A user can specify the data to be collected and the schedule according to which data is collected. In the illustrated embodiment, the hypervisor collects and time-stamps the data such that utilization and performance can be specified on a per-VM basis. Management agent 302 adds a client identifier to the collected client-side data so that it can be distinguished from client-side data collected from other client networks.

The collected data can be forwarded via tunnel 120 to management application 314. Upon receipt by ACE 316, the collected data is stored in a multi-tenant database 408 of management application 314 via a database engine 410, shown in in FIG. 4.

The customers/subscribers to the management services provided by MaaS server 116 are referred to herein as "tenants". As indicated by FIG. 4, MaaS server 116 can serve multiple tenants 411, 412, and 413. A tenant may be a business, a business division, or another entity. Each tenant can have one or more on-premises client networks 102, 414, and 415. Typically, each client network belongs to a respective tenant. Hence, the client identifier added by a management agent can be considered a tenant identifier (TID). If two client networks share the same tenant, the same TID can be used as the client identifier for both client networks. Alternatively, separate TIDs can be used for the client networks. In that case, the two TIDs are both assigned to the same tenant.

"Multi-tenancy" is an architecture in which a single instance of a software application, in this case, management application 314, serves multiple customers. Each customer is called a tenant. Tenants may be given the ability to customize some parts of the application, such as color of the user interface (UI) or business rules, but, typically, they cannot customize the application's code. Multi-tenancy can be economical because software development and maintenance costs are shared.

Each tenant can have one or more users 106, 421, 422, 423, 424, 425, 426, and 427 that can access MaaS server 116 using a respective user device 108. MaaS server 116 can communicate with respective client networks 102, 414, and 415, via respective sets of tunnels 120, 431, and 432. For example, a tenant may be an SMB and the users can be its employees.

Multi-tenant MaaS server 116 includes an access control 440 for authenticating users. The authentication process determines the tenant (e.g., SMB or department) to which a user belongs. Access control 440 modifies queries and commands by inserting a tenant identifier (TID) unique to the tenant to which the user belongs. Database engine 410 uses the TID to prevent a user from accessing data (in multi-tenant database 408) belonging to tenants other than the user's own tenant. In other words, the TIDs for the respective tenants are used for data isolation.

Management application 314 includes an analysis engine 442 that can analyze data in database 408 on an ongoing basis. In other words, analysis engine 442 can monitor database 408 for indications of conditions requiring intervention and can notify a user of the same. For example, a tenant can specify that an email or a Short Message Service (SMS) notification should be sent to a specified user whenever a virtual machine uses 90% or more of its available processor capacity. The user can then assign or purchase additional capacity, reduce the workload, etc.

In addition, analysis engine 442 can be used to detect data trends, e.g., for capacity planning purposes. Analysis engine 442 can also serve as an expert system making recommendations, e.g., anticipating failures and making recommendations to help prevent them. For example, higher (correctable) error rates may be used to anticipate a component failure. Analysis engine 442 is configurable on a per-tenant basis. Each tenant can specify thresholds to be detected and alerts to be sent.

Analysis engine 442 has access to data from all tenants. In principle, analysis engine 442 can provide recommendations based in part on data other than the data for the tenant benefitting from the data. For example, problems reported in response to an operating-system upgrade for tenant 411 can be the basis of a warning to tenant 412 to delay the upgrade, e.g., until the problems have been resolved. To ensure privacy, the warning would not specify the source for the warning. For further assurances, tenants would be required to provide permission to use their data to enhance the general knowledgebase. Incentives include a reciprocal benefit of the community knowledgebase. Also, a tenant that did not share data might be allowed to pay a higher fee to obtain the benefits of the community knowledgebase. A request handler 444 manages sessions with users in that it matches responses from client network 102 to their corresponding requests.

Figure 5:
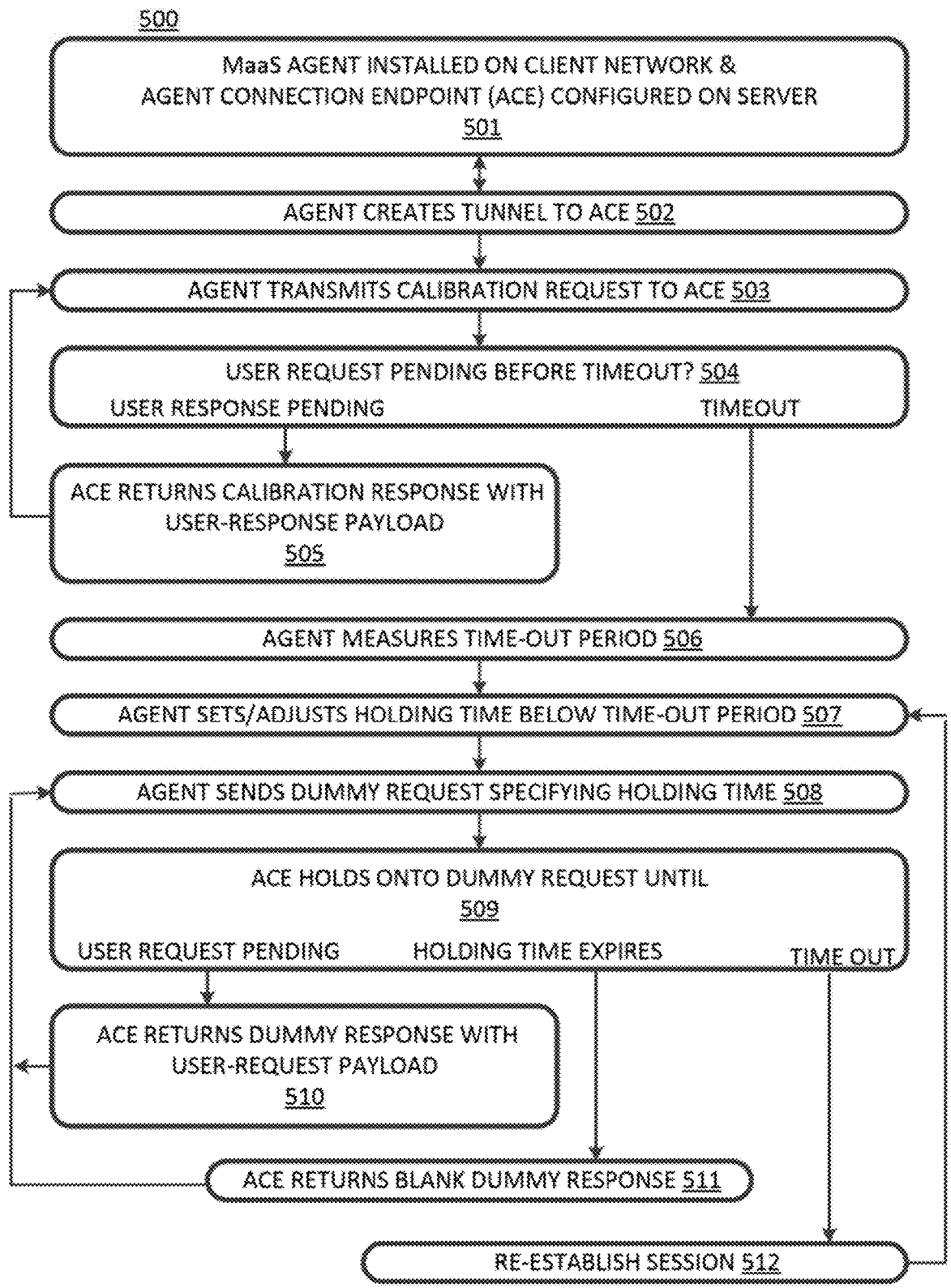
FIG. 5 is a flow chart of a process for setting up an RSO tunnel such as the RSO tunnel of FIG. 1.

A process 500, flow-charted in FIG. 5, provides for setting up an RSO tunnel so that a protected client network can receive user requests over the Internet. At 501, a MaaS agent is installed on the client network, and an agent connection endpoint (ACE) can be configured on a MaaS server. The server can be Internet-based, e.g., outside a firewall for the client network. The configuration of the ACE may occur before, after, or concurrently with installation of the MaaS agent at 501.

At 502, the MaaS agent forwards a port to the server to establish a tunnel. This allows the Internet-based MaaS server to connect to a specific service on the private client network. The forwarded port can be web-services (HTTP) port 80; this port can be forwarded to a port of the server associated with the ACE. The host for the forwarded port can then act as an HTTP server, while the ACE can function as its client. Thus, for the resulting tunnel, sessions originate at the client network client and are directed from the client network to the server.

The RSO tunnel has an associated payload protocol, in this case TCP, and an associated TCP/IP application-layer delivery-protocol, in this case HTTPS. In other embodiments, other payload protocols and other application-layer delivery protocols are used. In some embodiments, the payload protocol and the delivery protocol are the same; for example, they can both be HTTP or HTTPS.

At 503, the MaaS agent transmits a calibration request to the ACE. The calibration request can be a dummy request. At 504, a determination is made whether a user request is pending (at the ACE) before the calibration request times out. If a user request is pending, either because it was received before the calibration request is received, or because it is received as or after the calibration request is received but before time out, then, at 505, the ACE returns a calibration response with the user request as payload to the MaaS agent. At this point, process 500 returns to action 503, with the MaaS agent transmitting a new calibration request.

If instead, at 504, the calibration request times out, the ACE will notify the MaaS agent of the timeout. At 506, the MaaS agent measures the "time-out period", i.e., the time between calibration-request transmission and detection of the time-out. A request-response session can be terminated by a time-out, e.g., imposed by an Internet Service Provider (ISP), a firewall (if any), or an HTTP proxy (if any). If a session is terminated, it can be re-established using a handshake process that consumes plenty of processor cycles, and requires multiple packet round-trips. As a result, bandwidth consumption and latency increase. The MaaS agent has no reliable means of knowing the time-out period a priori, so the time-out period is determined empirically.

At 507, the MaaS agent sets a "holding time" for the ACE to hold a dummy request before responding to it. The goal is to ensure practically continuous pendency of dummy requests while minimizing the amount of tunnel bandwidth consumed by the dummy requests and the responses thereto. Longer holding times mean fewer dummy requests per unit time, but risk interruptions due to time outs. Shorter holding times reduce the risk of time outs, but increase tunnel traffic. In the illustrated embodiment, the response-time limit can be set as a percentage (e.g., 90%) of the time-out period. In the illustrated embodiment, holding times are usually between 10 seconds and 10 minutes.

At 508, the MaaS agent sends a dummy request, specifying the holding time, to the ACE. At 509, the ACE holds onto the dummy request until: 1) there is a user request pending, 2) the holding time expires, or 3) there is a time out. If there is a user request pending, the ACE returns a dummy response with the user request as its payload at action 510. If the user request is pending when the ACE receives the dummy request, the response is as immediate as possible. If the user request is received during the holding time, the dummy response is sent as soon as possible after receipt of the user request. If the holding time expires without receipt of a user response, at 511, the ACE returns a blank (no user request in the payload) response to the MaaS agent. Whether or not the dummy response includes a user request, process 500 returns to action 508 immediately to minimize the time a subsequent user request must wait before being forwarded to the client network.

If, at 509, the dummy request times out before a user request is received and before the holding time expires, the session may be re-established at 512. Once the session is re-established, the MaaS agent can adjust, at 507, the holding time downward to reduce the likelihood of interruption due to time outs.

Figure 6:
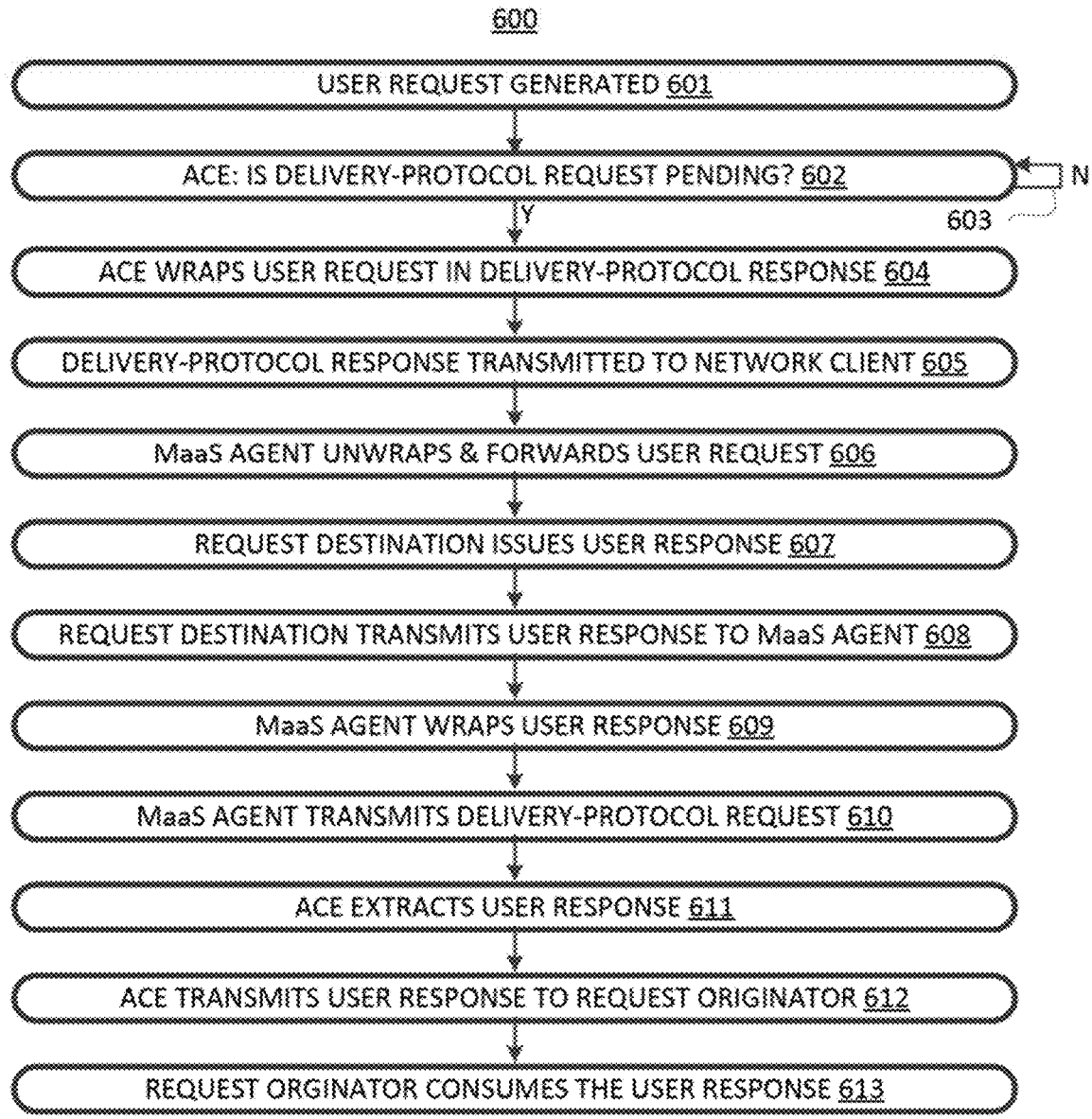
FIG. 6 is a flow chart of a process for handling a user request using the RSO tunnel of FIG. 1.

Process 500 is designed to optimize the user experience by minimizing any delay associated with remote (vs. local) access via a tunnel of a client network. The handling of a session initiated by a remote user is represented in FIG. 6 as process 600.

At 601, a user request is generated (asynchronously and independently of delivery-protocol request generation). For example, a user can interact with an app or web browser on a user device to generate a request and transmit it to the MaaS server. The server may forward the user requests "as is" or modify them before sending them on. "Modifying" can include translating from one format to the other, scheduling a series of modified user requests in response to a single user request, and other modifications, e.g., by a management or other application executing on the MaaS server.

At 602, the ACE determines whether or not a delivery-protocol request is pending locally. If not, the ACE waits before proceeding to action 604, as indicated by the loop-back arrow 603. Process 500 (FIG. 5) ensures this wait is brief. Once a delivery-protocol request is pending, then, at 604, the ACE wraps the user request in a delivery-protocol response to the pending delivery-protocol request. As suggested earlier, this can involve wrapping user request packet payloads as payloads in delivery-protocol packets.

The user request can be packetized and included as payloads in delivery-protocol response packets that identify the client network port as a destination and identify a session associated with a prior delivery-protocol request. The delivery-protocol packets can be encrypted, e.g., according to an applicable transport-layer security (TLS, SSL) protocol. At 605, the delivery-protocol response (encapsulating user requests) is transmitted through the RSO tunnel to the network client.

At 606, the MaaS agent unwraps the user request and forwards it to their intended destination, e.g., a hypervisor, on the client network. This can involve decrypting the payload and appending a header to form a complete TCP packet. The header can specify the TCP packet destination as the destination is fixed and known by the MaaS agent. The header can specify the source of the encapsulating HTTPS packet as the source for the TCP use-request packet. The intended destination may respond, e.g., by turning a virtual machine on or off as called for by the user request.

At 607, the destination, e.g., the hypervisor, can issue a user response (that is, a response to a user request), typically in the same protocol as the user request. The user response may indicate that the destination that the user request has (or has not) been fulfilled; also the user response may include information called for by the user request. The destination can transmit the user response to the MaaS agent at 608.

At 609, the MaaS agent wraps the user response in a delivery-protocol request. This wrapping can involve stripping the header from TCP packets and encrypting the payload. At 610, the MaaS agent transmits the delivery-protocol request (that encapsulates the user response) to the ACE on the MaaS server.

At 611, the ACE extracts (unwraps) the user response from the delivery-protocol request. This can involve generating a header and appending it to the TCP payload. At 612, the ACE transmits the user response to the request originator, e.g., to its destination on the server. At 613, the request originator (the MaaS server or user device) consumes the user response. In other words, the server consumes and/or forwards (to the user via a user device) the user response. Depending on the scenario, a session can have additional round-trip request-response transactions.

Figure 7:
FIG. 7 is a flow chart of a process in which a user submits a query to the MaaS server of FIG. 3.

A MaaS process 700 is flow-charted in FIG. 7. At 701, MaaS agents are installed on one or more client networks. At 702, the agents create RSO tunnels to MaaS servers. At 703, the agents repeatedly collect client statistics data, e.g., to detect patterns and trends. Different schedules may be used for different client networks. At 704, the agents send the collected network data over the RSO tunnels or paths that bypass the RSO tunnels to the MaaS server. At 705, the MaaS server modifies the queries to include respective tenant identifiers. At 706, the modified data is stored in a database residing on the MaaS server and/or outside the client network and accessible by the MaaS server.

At 711, a user submits to the MaaS server a query, e.g., regarding process utilization by a virtual machine running on a client system that the user is authorized to manage. At 712, the MaaS server, e.g., in connection with an authentication process, adds the respective tenant identifier (TID) to the query. This has the effect that only data records having the matching TID are accessed in responding to the query at 713. At 714, the MaaS server returns a response to the user. The response is based on data collected from the respective client network and is not based on data collected from other client networks associated with different TIDs.

Figure 8:
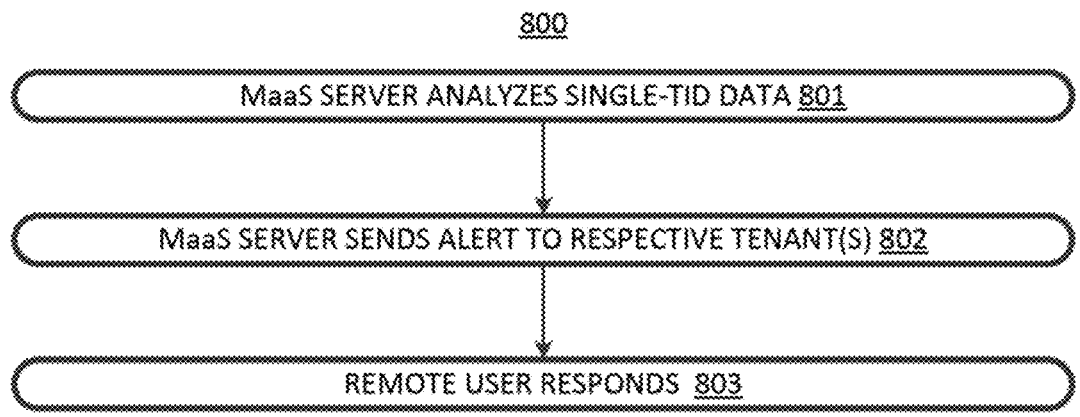
FIG. 8 is a flow chart of a process by which the MaaS server of FIG. 3 provides alerts and other messages to a remote user.

The database can be accessed not only by users, but by a resident (to the MaaS server) analysis engine, as in process 800, flow-charted in FIG. 8. At 801, the analysis engine analyzes the network data for a given client network. For example, process, network, and storage utilization can be analyzed on a per-VM bases. At 802, the MaaS can issue messages, e.g., alerts to a user or tenant, if some threshold or other criterion is met. In addition, time profiles for each parameter can be used to predict patterns and trends. These, in turn, can be used to send messages with predictions, for example, regarding how long a virtual machine can operate unimpaired before capacity constraints throttle it.

At 803, a remote user can respond to an alert, a recommendation, or a notice that an automated action has been taken, without having to await a return to the client premises. This can be important where the message calls for a prompt response. The response may include a request to the MaaS application and/or to the client network. Communication over the tunnel can be required when interacting with on-premises hosts (e.g., for powering on or deleting VMs). However, action 803 provides for any kind of user action, regardless of whether or not it needs to go over the tunnel. One example a response that does not need to go over the RSO tunnel is a user snoozing an alert because it can be resolved at a later time, in which case the MaaS server does not need to do anything except to resurface the alert in the future.

In an alternative embodiment, the message is sent to the client network instead to of or in addition to a user or a tenant. For example, a tenant may provide policies for automated responses to detected conditions. For example, there may be a policy that, if the MaaS application detects high utilization by a VM running on a first host, the MaaS server may send a command to activate second instance of the VM on a second host.

Figure 9:
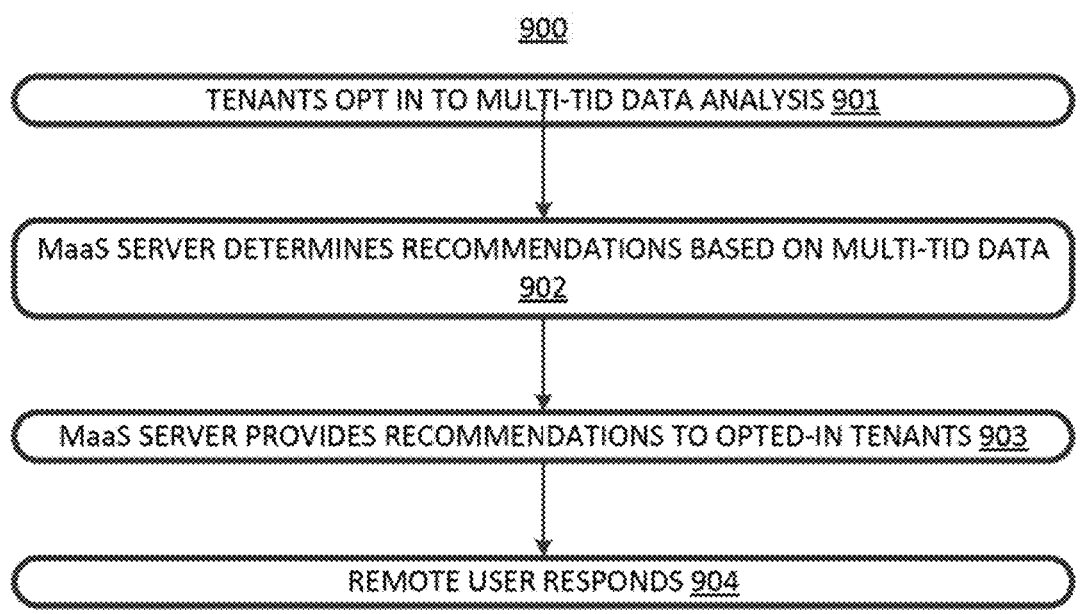
FIG. 9 is a process by which the MaaS server of FIG. 3 provides recommendations using data collected from plural client networks.

In process 800, the analysis engine accesses data from a single client network. However, one advantage of a MaaS implementation is that data belonging to multiple tenants can be used to provide enhanced recommendations, as in process 900, flow charted in FIG. 9. At 901, plural tenants of a MaaS system elect to participate in a multi-tenant recommendation feature. In consideration for the enhanced recommendations, the electing tenants may give permission to use their data, or pay for a higher level of service without sharing their own data. At 902, the MaaS server, e.g., its analysis engine, analyzes data belonging to multiple tenants to determine recommendations for a selected one of the tenants. At 903, the MaaS server provides the recommendation to the respective tenant. At 904, a user can respond as in action 803 above for process 800 (FIG. 8).

Herein, an "application programming interface" (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising the interface. An API port is a communications node for communication with an associated application or protocol. In the illustrated embodiment, the port to be forwarded has the number 80, which is conventionally assigned to the HTTP protocol.

In general, an API port can have a numerical identifier and can be addressed by combining an IP address for the application host with the port number for the application itself. A command line string or other technique can be used to forward one port, e.g., the HTTP port on a physical host of the client network, to another, e.g., the port associated with the ACE on the MaaS server. The result is a tunnel having a delivery protocol such as HTTP or HTTPS.

Herein, a "tunnel" is a communications channel of a network that includes a hardware layer and encapsulates packets or portions thereof conforming to a first "payload" protocol within packets conforming to a second "delivery" protocol compatible with the network. Herein, the delivery protocol is a TCP/IP application-layer protocol. Herein, "wrapping a request" and "wrapping a response" encompass wrapping on a packet-by-packet basis.

The Internet Protocol Suite (also known as TCP/IP) specifies how information is conveyed over the Internet and similar networks. More specifically, TCP/IP provides end-to-end connectivity specifying how data should be packetized, addressed, transmitted, routed, and received at the destination. This functionality is organized into four abstraction layers which are used to sort all related protocols according to the scope of networking involved. From lowest to highest, the layers are: the link layer, containing communication technologies for a single network segment (link); the internet layer, connecting hosts across independent networks, thus establishing internetworking; the transport layer handling host-to-host communication; and the application layer, which provides process-to-process application data exchange and maintains sessions. Application-layer packets are encapsulated as payloads in transport-layer packets, which are encapsulated as payloads in internet-layer packets, which are encapsulated as payloads in link-layer packets.

Depending on the embodiment, the client network can include one or more physical servers or other computers. The computers of a client network may be arranged in a local-area network (LAN) or a wide-area network (WAN). The client network may include wireless networking or wired networking or both. Physical servers may host virtual machines supported by various virtualization technologies.

The MaaS server may be a simple forwarding service for remote user requests or may include an application that responds in simple or complex ways to user requests, generating its own user requests in response to remote user requests or acting autonomously. The MaaS server may support MaaS applications. The payload protocol for the RSO tunnel will depend on the protocol expected by the payload destination on the client network. The MaaS server may include a standalone or other hardware computer, a network of servers operating as a single server, or a partition of a physical server, and/or virtual machines running on any of the above.

Herein, a "system" is a set of interacting elements, wherein the elements can be, for example, devices, atoms, actions, and other systems. Herein, a "process" is a system in which the elements are actions.

Herein, a "computer" is a system including storage media, at least one processor, and communications devices. The communications devices provide for receiving and transmitting physical representations of data. The storage media is used for storing physical representations of data for storing physical representations of data. The processor is for processing some "data-type" data in accordance with "instruction-type data".

Herein, "virtual" means not physically existing as such but made by software to appear to do so. For example, a "virtual computer" is not a computer (it lacks hardware), but appears to software running on it as though it were a computer. A "virtual machine" is a virtual computer and is not a machine. "Physical" and "tangibles" are antonyms of "virtual". Herein, a "server" is a physical or virtual computer that provides services to one or more other physical or virtual computers, which are "clients" of the server.

Herein, a "network" is a system including at least one computer and at least one communications channel over which it can communicate with another computer or device. Herein, a "firewall" is a functional element that controls communications to and from a network. Portions of a network protected by a firewall are said to be "behind" the firewall. Typically, a firewall is configured to allow the network transmit communications, while limiting access to the network from outside the network. Typically, a firewall is configured to allow outgoing communications, e.g., a request from a client inside the firewall to a server outside the firewall, but to block incoming communications unless they are in response to an outgoing communication.

The Hypertext Transfer Protocol (HTTP) is a widely-used computer communications protocol in which an HTTP client issues requests to an HTTP server and the HTTP server returns responses to the client. Typically, a firewall allows outgoing HTTP requests, allows incoming responses to the outgoing HTTP requests, and blocks incoming HTTP requests. Herein, "client-side" means "behind the firewall". "Client network" refers to a network and all components thereof that a firewall is (at least presumably) configured to protect.

Strictly, "data" is abstract information that can be represented physically, e.g., by memory states and voltage levels. As shorthand used here, "data" can refer to the physical representations of data. "Statistics data" herein refers to data that collectively can be analyzed to detect patterns and/or trends. For example, values of a parameter collected at different times constitute statistics data. Herein, "client statistics data" refers to statistics data collected on the client side of a firewall. The statistics data can include data regarding virtual machines and their hosts that are regarded as part of the client network.

Herein, a "tenant" is an entity having functional possession of a network or application. The tenant may have possession as an owner or lessee of the network. The tenant may be a business or a department of an enterprise. Users authorized to manage the network are typically employees of the tenant or people otherwise associated with the tenant. Herein, a "tenant identifier" or "TID" is an identifier that identifies the tenant associated with a client network. A client identifier can serve as a TID for the tenant possessing the client.

These and other variations upon and modifications to the illustrated embodiments are provided for by the present invention, the scope of which is defined by the following claims.

What is claimed is:

1. A network Management as a Service (Maas) process comprising:
    creating, using a management agent running on a client network, a reverse session-origin (RSO) tunnel from the client network, within a firewall, through the firewall of the client network, and to a management server outside the firewall;
    sending, by the management agent, dummy requests from the client via the RSO tunnel to the management server;
    collecting, by the management agent, client statistics data at and regarding the client network, said client statistics data including performance and utilization data from said client network and further including utilization data from virtual machines and hosts of said client network, wherein said utilization data from said virtual machines and said hosts of said client network is collected by a hypervisor, and wherein said utilization data from said virtual machines and said hosts of said client network is specified on virtual machine basis;
    transmitting the client statistics data to the management server;
    generating, by the management server, user requests based on the statistics;
    wrapping, by the management server, the user requests in responses to the dummy requests; and
    transmitting, by the management server, the wrapped user requests via the RSO tunnel to the client network such that said MaaS process is provided utilizing said client statistics.

2. The network Management as a Service (Maas) process of claim 1 wherein the client statistics data includes utilization data.

3. The network Management as a Service (Maas) process of claim 2 wherein the client statistics data includes performance data and data describing configuration changes of the client network or any of its components.

4. The network Management as a Service (Maas) process of claim 1 wherein the collecting includes collecting client statistics data from plural client networks associated with respective client identifiers, wherein the transmitting includes transmitting collected client statistics data via plural tunnels associated with the plural respective client networks, and wherein the client statistics data collected from the plural client networks is associated with respective client identifiers in a database stored on the management server.

5. The network Management as a Service (Maas) process of claim 4 comprising:
    receiving a query from an authorized user of a first client network of the plural client networks;
    modifying the query to specify the client identifier for the first client network; and
    using the specified client identifier so as to respond to the query based in part on data collected from the first client network and not based in part on data collected from a second client network of the plural client networks.

6. The network Management as a Service (Maas) process of claim 4 comprising providing to an authorized user for a first client network a recommendation regarding management of a virtual machine on the first client network based in part on collected data associated with a first client identifier in the database and based in part on data in the database associated with a second client identifier associated with a client network for which the user is not an authorized user.

7. The network Management as a Service (Maas) process of claim 4 wherein the client identifier is a tenant identifier (TID), the TID identifying a tenant that is an owner or lessee of the client network.

8. A system comprising non-transitory media encoded with code that, when executed using hardware causes the hardware to implement a network Management as a Service (Maas) process including:
    creating, using a management agent running on a client network, a reverse session-origin (RSO) tunnel from the client network within a firewall, through the firewall of the client network, and to a management server outside the firewall;
    sending, by the management agent, dummy requests from the client via the RSO tunnel to the management server;
    collecting, by the management agent, client statistics data at and regarding the client network said client statistics data including performance and utilization data from said client network and further including utilization data from virtual machines and hosts of said client network, wherein said utilization data from said virtual machines and said hosts of said client network is collected by a hypervisor, and wherein said utilization data from said virtual machines and said hosts of said client network is specified on virtual machine basis;
    transmitting the client statistics data to the management server;
    generating, by the management server, user requests based on statistics;
    wrapping, by the management server, the user requests in responses to the dummy requests; and
    transmitting, by the management server, the wrapped user requests via the RSO tunnel to the client network such that said MaaS process is provided utilizing said client statistics.

9. The network Management as a Service (Maas) system of claim 8 wherein the client statistics data includes utilization data.

10. The network Management as a Service (Maas) system of claim 9 wherein the client statistics data includes performance data and data describing configuration changes of the client network or any of its components.

11. The network Management as a Service (Maas) system of claim 8 wherein the collecting includes collecting client statistics data from plural client networks associated with respective client identifiers, wherein the transmitting includes transmitting collected client statistics data via plural tunnels associated with the plural respective client networks, and wherein the client statistics data collected from the plural client networks is associated with respective client identifiers in a database stored on the management server.

12. The network Management as a Service (Maas) system of claim 11 wherein the process includes:
   receiving a query from an authorized user of a first client network of the plural client networks;
   modifying the query to specify the client identifier for the first client network; and
   using the specified client identifier so as to respond to the query based in part on data collected from the first client network and not based in part on data collected from a second client network of the plural client networks.

13. The network Management as a Service (Maas) system of claim 11 wherein the process includes providing to an authorized user for a first client network a recommendation regarding management of a virtual machine on the first client network based in part on collected data associated with a first client identifier in the database and based in part on data in the database associated with a second client identifier associated with a client network for which the user is not an authorized user.

14. The network Management as a Service (Maas) system of claim 11 wherein the client identifier is a tenant identifier (TID), the TID identifying a tenant that is an owner or a lessee of the client network.

15. The network Management as a Service (Maas) system of claim 8 wherein the process includes wrapping a user request originating from the user device in a delivery-protocol response for transmission to the client network via the RSO tunnel.

16. The network Management as a Service (Maas) process of claim 1 wherein the process includes wrapping a user request originating from the user device in a delivery-protocol response for transmission to the client network via the RSO tunnel.

\* \* \* \* \*